UNITED STATES PATENT OFFICE.

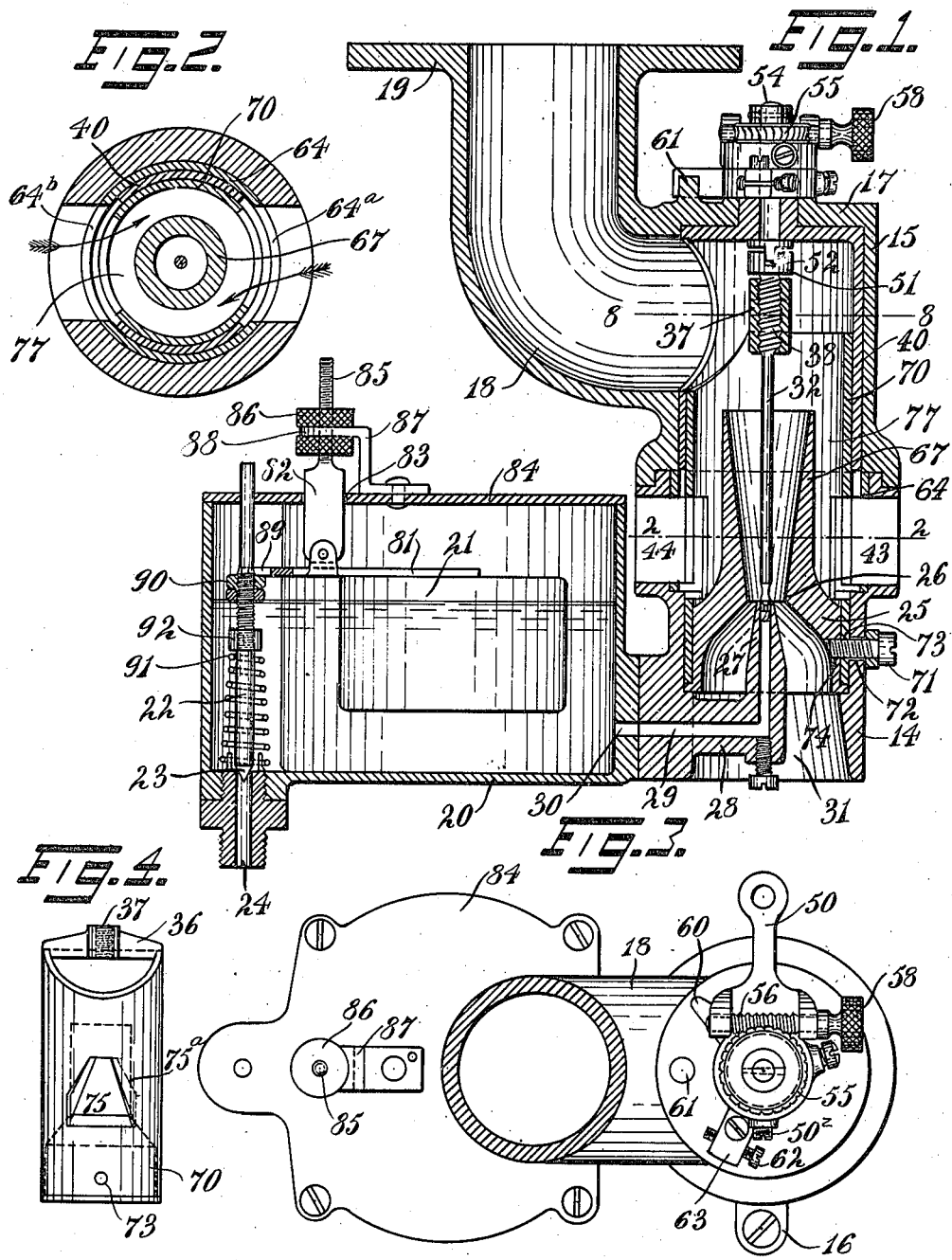

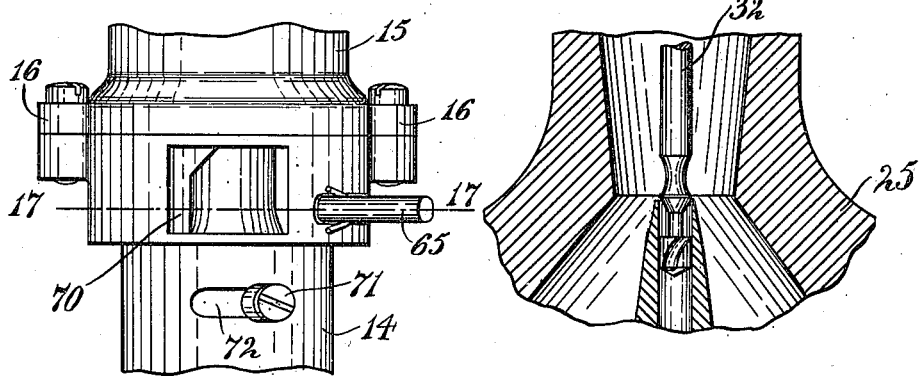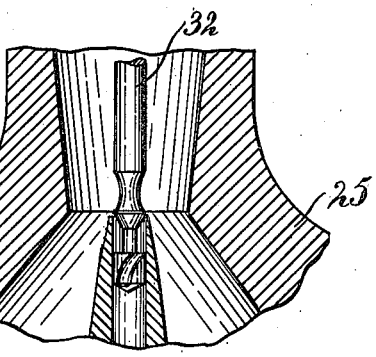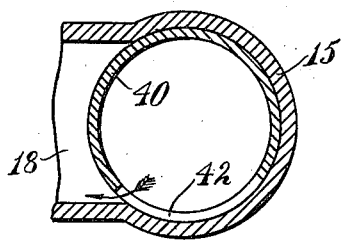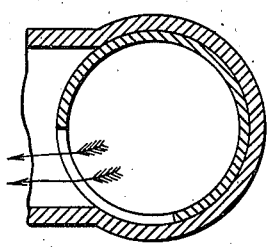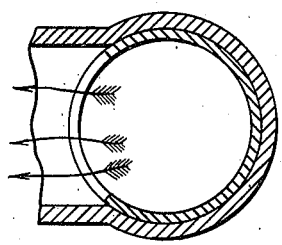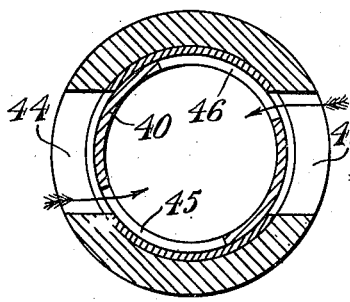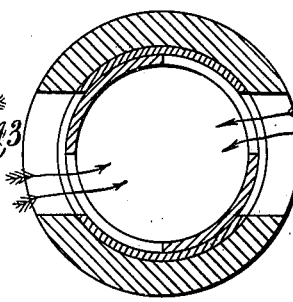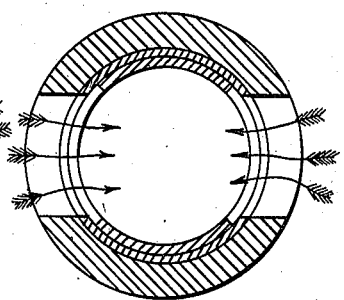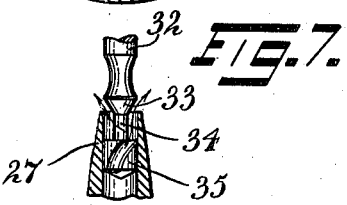

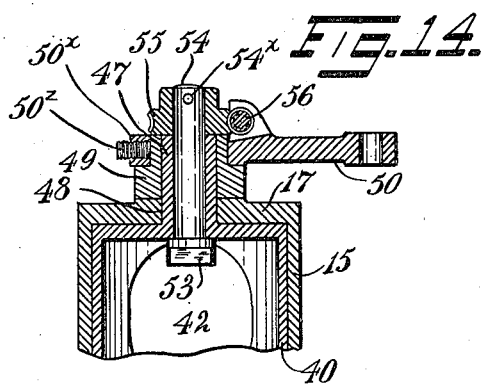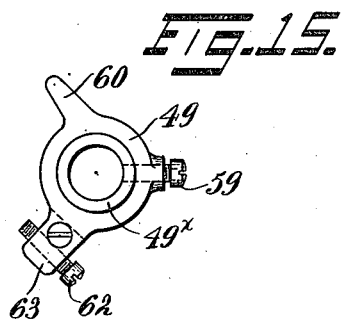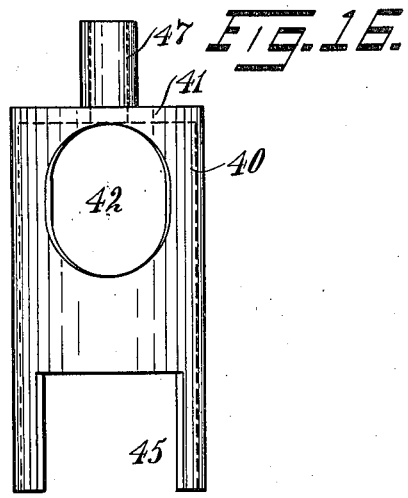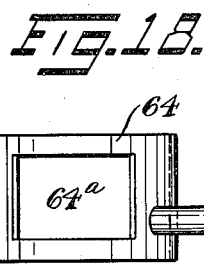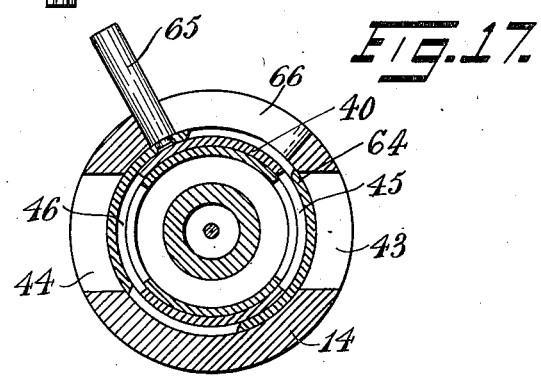

AMHERST G. LAMB, OF TORRINGTON, CONNECTICUT; ELLA A. LAMB, OF TORRINGTON, CONNECTICUT, ADMINISTRATRIX OF SAID AMHERST G. LAMB, DECEASED.

CARBURETER.

1,191,522. Specification of Letters Patent. Patented July 18, 1916.

Application filed May 3, 1910. Serial No. 559,186.

*To all whom it may concern:*

Be it known that I, AMHERST G. LAMB, a citizen of the United States, residing in Torrington, in the county of Litchfield and State of Connecticut, have invented certain new and useful Improvements in Carbureters, of which the following is a specification.

One of the principal objects of my present invention is to provide a simple and effective carbureter apparatus in which the incorporation of the fuel with the air will be effected by a two-stage process in which the mixture or combination of fuel and air at the first stage will be produced by the use of a relatively small quantity of air so that the mixture as made at this first mixing point will be excessively rich in fuel and therefore unsuitable for combustion in the engine, but will be carried on and become incorporated with the main air supply on the way through the conduit pipe leading from the carbureter to the engine.

Another of the objects of this invention is to provide a carbureter with means for simultaneously regulating the exit port and the air admission port preferably that for the auxiliary air supply.

Another object of the invention is to provide means whereby the admission of the fluid through the valve in the Venturi tube can be controlled from the wheel of the motor car, or other distantly located place; and in combination therewith means are provided whereby the inlet or the outlet ports of the carbureter, or preferably both, are simultaneously opened or restricted.

A further object of the invention is to provide means for adjusting the connection for this fluid admission valve so that it can be regulated to control its opening relative to that of the concurrently operated ports, to accommodate for different degrees of viscosity of the hydrocarbon, and to allow for different atmospheric conditions, either of humidity or of barometric pressure.

Another feature of my present invention relates to the mechanism or combination whereby the fuel supply is automatically regulated for reducing the same on turning the main air control toward the closed position thereof, in connection with means carried by said main air control devices, whereby the fuel supply control is adjustably regulatable by hand, and this in a manner to avoid interference with the corresponding automatic operation of the air control and the fuel supply.

A further object of the invention is to provide an improved construction of the Venturi tube whereby the main air supply and that from the auxiliary ports will not commingle until they reach the mixing chamber proper and just prior to their exit from the carbureter.

A further object of the invention is to provide means for giving the auxiliary air as admitted a helical movement before reaching the said mixing chamber to there commingle with the vapor formed in the Venturi tube.

A further object of the invention is to provide in connection with the simultaneously operated auxiliary air inlet and mixture outlet ports, means for varying the proportion of the openings that shall exist at any position of control of the same.

Another advantage in the present construction is the provision in connection with the float and admission valve for the hydrocarbon, means for vertically adjusting the fulcrum of the connection between the said members, whereby the leverage effect on the valve by the float can be maintained constant, as well as to compensate for the buoyant effect on the float by the varying degrees of density of the hydrocarbon.

In the accompanying drawing representing one embodiment of my invention, Figure 1 is a vertical axial section, partly in elevation. Fig. 2 is a transverse section on the line 2—2 indicated in Fig. 1. Fig. 3 represents a plan view. Fig. 4 shows separately one of the valve regulating means. Fig. 5 is a partial end elevation showing one of the admission ports for the auxiliary air supply. Fig. 6 shows enlarged a fragmentary section through the valve portion of the Venturi tube. Fig. 7 is a similar view showing only the inlet tube and the valve, the latter being in the wide open position. Figs. 8, 10 and 12 are views showing in section diagrammatically the outlet port in different positions, as indicated on the line 8—8 of Fig. 1; and Figs. 9, 11 and 13 are diagrammatic views in section on the line 2—2 of Fig. 1 showing the inlet valve for the auxiliary air in different positions relatively to that of the outlet valve as shown in Figs. 8, 10 and 12 respectively. Fig. 14 is an enlarged section showing the upper part of the device only. Fig. 15 shows the head. Fig. 16 is an elevation of the shell or shutter member. Fig. 17 is a section on line 17—17 of Fig. 5; and Fig. 18 shows another of the shutters attached.

The carbureter is shown as comprising a shell or casing formed of two cylindrical sections 14 and 15 secured together by ears 16 to form a practically continuous tube that is formed in these two parts for convenience of assembling the interior parts. The upper portion of the shell has the upper end 17 closed, and an elbow 18 projects laterally at one side, and may be provided with a flange 19 for securing to a manifold, or to a conduit leading to the engine. At the lower part the shell section 14 is connected with a vessel 20 for the gasolene or other fluid that may be used. This contains any desired form of float, such as a ball 21, that is shown as operating an inlet valve 22 controlling a seat 23 at the inlet 24 in the bottom of this vessel. In the shell or casing at the lower portion, is arranged a tube 25 having a constricted throat at 26; which member is generally termed a Venturi tube, and which has its outer part partially closing the bore of the shell member. The lower end of the shell being open for the main supply of air, when the air is drawn in by the suction stroke of the engine, it will be throttled and caused to pass through the throat of the Venturi tube. It is at this portion that the usual inlet tube or spray orifice for the fluid is located, and a conical tube 27 has its upper end terminating at the throat portion 26 of the tube 25. The tube 27 has an angular portion 28 whose bore 29 connects with a bore 30 in the wall of the vessel 20 for the float, thereby providing an inlet passage for the fluid from the chamber, having exit at the reduced upper end of this inlet tube. The suction from the engine will draw the air up through the open portion 31 of the shell around the inlet nozzle and spray orifice, and its velocity is increased at the constricted throat portion around the orifice, producing the aspirating action whereby the gasolene is drawn upward and turned into vapor as it passes up through the Venturi tube. And further by reducing the small end of the Venturi tube to such a small diameter at the point where it receives the fuel and the initial air supply, that the air at this point will normally be heavily overcharged with fuel. Owing to the taper and length of the interior of said Venturi tube (see Fig. 1) it is obvious that the small amount of air normally drawn in at the point 26 will rapidly reduce in velocity, while the stream thereof correspondingly enlarges until this stream emerges from the upper end of said tube into the interior of the annular stream of the main air supply which flows outside of said internally tapering tube.

By means of the reduced entrance to the Venturi-tube only the priming charge of air is admitted and suction of the engine naturally operates to form a partial vacuum throughout the interior passages between the air-inlets of the engine, including the space ordinarily designated as the mixing chamber, and in the Venturi tube this vacuum will evidently be intensified by reason of the rapidly enlarging area of the cross section of the tube in passing from the small toward the large end of the same. Thus the gasolene is sprayed into a relatively small volume of air which passes into the small end of said tube, and during the passage through said tube is largely increased in volume by reason of the suction aforesaid. By means of this peculiar action and the manner in which the priming charge of air is thus mixed instantly in the interior of this tube, the gasolene is vaporized with the highest degree of efficiency, through the well known action of a vacuum increasing the vaporization of volatile fluids.

In Fig. 1, the casing is shown having a main air-inlet, as 31 and a tubular air-regulating valve, as 40, is arranged to turn within the casing, and has an air-inlet regulating portion near the lower end thereof, as 45. This air-valve also has an air-outlet regulating portion near the upper end thereof, as the portion 42, Fig. 16, located and arranged for the escape of the carbureted air sidewise from the interior of the said tubular valve. The internally tapered tube, 67, (also known as a "Venturi" tube,) is located with said tubular air valve and longitudinally thereof, and has its enlarged discharge end extending above the air-inlet, whereby to form an annular conduit within the tubular air-valve and surrounding the discharge end of said tapering tube. The fuel supply nozzle 27, with its valve 33, for the fuel supply is located at the small end of said Venturi tube, and the adjustable actuating connections are provided for concurrently operating the said tubular air-valve and the fuel valve. The connections may be varied in arrangement and specific construction, but I prefer them arranged as illustrated herein.

The valve for controlling the spray orifice of the inlet tube is shown as comprising a stem 32 having a valve portion 33 at its lower end Fig. 7 of a size to vary the passage of the fluid through the top of the inlet tube 27. The valve is preferably provided with a suitable guiding means that may extend down into the tube and constructed whereby it will not impede the flow of the gasolene up through the tube. As shown, the valve member has a reduced stem 34 below which is a head 35 or winged member having portions engaging the bore of the tube, but providing passages for the fluid. The valve stem projects upward through the shell and at the top is provided suitable means whereby the stem can be reciprocated to adjust the valve and regulate the inlet of the fluid. Means are also preferably provided whereby a swinging lever is connected with this valve stem so that upon rocking the lever by suitable means from a distant place, such as the steering wheel of a motor car, the valve will be given an endwise movement to and from its seat, as well as a rotative movement; in other words a screw motion is imparted to the valve stem whereby the valve is shifted toward and from its seat at will by the driver of the car, and the available area of escape for the gasolene or fluid at the spray orifice in the Venturi tube, is thereby controlled at will. A bar 36 Fig. 4 is suitably supported at the upper part of the shell and contains a threaded bore 37 that is engaged by a threaded portion 38 on the valve stem. By this means a swinging movement imparted to the valve stem will cause the valve to move toward and from the seat in the inlet tube.

By reason of the organization of the several operative parts of the mechanism, when arranged as herein set forth, the concurrent regulation of the fuel supply relatively to the regulation of the main air supply (and also of the regulation of the exit opening to the elbow 8), said fuel supply is regulated in quantity by means of a valve, as for instance the valve 33, which has during the regulative action a combined longitudinal and rotative movement, whereby the guiding part of the valve itself, this consisting of projecting grooved stem 35, is caused to operate after the manner of a clearing device or instrument whose natural tendency under such conditions is to keep the diminutive outlet for the liquid fuel free of obstruction and continuously in a proper working condition.

Means are also provided to control the exit from the carbureter, shown as cutting off the opening from the shell into the elbow 18. This means is shown as comprising a tube 40 (see Fig. 16) rotatable in the shell or casing 14—15, having its upper end closed at 41, and having an opening 42 that in one position of the shell will register with the opening of the shell into the elbow; therefore by swinging this tubular member the exit of the gas from the shell can be controlled as the opening is throttled.

In vaporizers of various kinds, it is customary to provide an auxiliary air supply which will admit air into the carbureter to commingle with the mixture of gasolene and air that is formed at the Venturi tube, and which is usually admitted into the shell in close proximity to such portion. I provide one or more lateral openings in the shell and preferably these openings are controlled or throttled by means connected with the said throttling means for the exit. The shell 14 is shown as provided with openings 43 and 44, and the said exit-controlling shell or shutter 40, that is rotatable inside of the casing or shell 14—15, is extended downward to cover these openings in one position, but having in itself openings 45 and 46 that when the shell is turned, will more or less uncover and expose these openings for the admission of the auxiliary air supply. Preferably, these openings in the lower part of the shutter are so located relative to the exit opening at the top of the shell that the exit port and the inlet ports will be concurrently opened or restricted. One feature of my present improvements relates to the structural organization of the air supply controlling mechanism whereby a convenient and effective method of assembling the several operative parts is attained and whereby at the same time these several parts are adapted to be finished in the process of manufacture by the method of turning; the several parts being so formed and fitted together that the inner members form bearings around which other members rotate, as for instance the member 70 forms an internal bearing or guide for the member 40, and the member 40 similarly forms an internal guide or bearing for the air control member 64 for the main air supply. In the present invention the same means that opens and closes the inlet valve at the spray orifice, also swings this shutter member to simultaneously open and close the outlet and the auxiliary air ports. As shown, the top 41 of the shell 40 has a stem 47 projecting through an opening 48 in the top portion 17 of the shell section 15. This is secured to a head 49 carrying a lever 50, by which means the shell 40 can be swung. Means are also preferably provided for adjustably connecting the valve stem controlling the valve for the spray orifice in the Venturi tube, with this oscillating shell or shutter that regulates the inlet and outlet ports. At the upper end of the valve stem 32 is a head 51 containing a slot 52 into which extends a rib 53 on the lower end of a spindle 54 projecting upward through the tubular stem 47 of the cylinder 40. This spindle carries a worm wheel 55 meshing with a worm 56 rotatably carried by the head 49.

When the head is swung by the lever, the worm will cause the worm wheel to move therewith as if rigidly connected thereto. But upon turning the worm by its head 58 the spindle 54 will be swung relative to the head and shell 40. When the shell is turned by swinging the lever, the rib 53 on the spindle engaging the slot 52 in the end of the valve stem, will cause the valve stem to be rotated. But the threaded portion of the valve stem turning in the threaded socket 37, will cause the valve to have an endwise movement, that is permitted by a certain amount of movement of the rib in the slot. Thereby the swinging of the shell that controls the exit and inlet ports will simultaneously swing the valve that controls the spray orifice. As the exit from the carbureter to the engine is opened permitting the suction of the engine to draw more vapor, the inlet valve for the fluid is simultaneously opened permitting a greater amount of the gasolene or other fluid to be fed or sucked in, and at the same time the ports for the auxiliary air supply are opened wider admitting a greater supply of the latter. And the amount of the opening for the fluid relative to the said air inlet and outlet openings can be varied at will by turning the said worm on the head.

The head 49 (shown separately in Fig. 15) is substantially annular to fit on the tubular stem 47 of the shell 40, to which it is locked by suitable means, such as a screw 59. The head has a projecting lug 60 that will engage a pin 61 on the outside of the shell or casing, and limit the swing of the head in one direction. The movement in the opposite direction is limited by an adjustable stop, such as a screw 62 engaging a threaded bore in a lug 63 on the head, which engages the opposite side of this pin 61. The lever 50 has an annular extension 50$^x$ surrounding a reduced neck portion 49$^x$ of the head, and is adjustably secured thereon by a screw 50$^z$. By these several adjustments, the parts can be set to operate as desired. Initially the parts are all loosened and the inner casing or shutter 40 is set to cause its opening 42 to register with the opening in the shell. Then the head is swung to bring one of its lugs against the stop pin and secured to the tubular extension 47 of the shell 40, by the screw 59. The shell is then swung to the open position and the amount of such opening can be nicely regulated by the adjusting screw 62 engaging the stop pin 61. The worm wheel 55 is secured to the spindle 54 in any suitable manner, such as by a pin 54$^x$. The lever 50 is now brought to the limit of its position for opening the exit and inlet ports, and thereupon the screw 55$^x$ is tightened on the head that will clamp the lever to the head; the latter being secured to the shutter 40 by the screw 59. The lever is now swung to the limit of its closing position and the head 58 is turned to adjust the valve controlling the spray orifice to its minimum desired opening, which is done by the swinging of the spindle 54 engaging the upper end of the valve stem, and turning the latter in its screw bearing in the bar 37.

Fig. 8 represents diagrammatically the exit port 42 at the upper part of the shell or mixing chamber, with the opening 42 in the shell 40 having but a small portion registering with the outlet and consequently very much throttled. Fig. 9 represents the same position of the lower portion of the outer shell or casing, the openings 43 and 44 at the lower portion of the casing being also very much throttled by the shutter. As the shell 40 is swung by the head it will give a larger outlet opening as indicated in Fig. 10. This movement of the shell will also produce a larger opening through the auxiliary air passages at the lower part as indicated in Fig. 11. When the shell is swung to give a full open position at the exit as indicated in Fig. 12, the auxiliary air ports 43 and 44 are fully opened, as shown in Fig. 13. Fig. 6 indicates the valve at the spray orifice in its lowermost portion in which it will be placed when the shell is swung to the position indicated in Fig. 8, and a minimum amount of the fluid can pass through the outlet. When the head has been swung to fully open the inlet and outlet ports as indicated in Figs. 12 and 13, the valve will be raised to its maximum open position as indicated in Fig. 7, and the full supply of the fluid will be furnished. It will be noted that in my improved carbureter the initial, or priming air supply which is drawn in through the small end of the Venturi tube is taken from the external atmosphere at a point where it is relatively unaffected by the air currents which may be drawn in through the main air supply inlet so that at no time is the priming or initial air supply directly affected by the air currents of the main air supply. It is to be understood that this arrangement for the concurrent opening and constricting of the inlet and outlet passages, together with the simultaneous adjustment of the valve for the spray orifice, can be employed with any desired arrangement of the Venturi tube, or with a gasolene admission of other construction.

Means are also provided whereby the auxiliary air port can be closed independent of the movement of the shutter or shell 40, whereby the outlet for the mixture, and the inlet at the spray orifice can be opened more or less, yet no auxiliary air will be admitted. This is desirable in starting, for the purpose of priming the motor to obtain a rich mixture at a time when the engine is cranked and the suction is comparatively weak. A supplemental shutter or ring 64 is mounted to swing a suitable recess in the lower casing member 14, just outside of the lower end portion of the shutter 40, as indicated in Figs. 2 and 17. This ring is provided with openings 64$^a$ and 64$^b$ on opposite sides that will normally register with the auxiliary air openings 43 and 44 in the casing section 15, as indicated in Fig. 9. This shutter is shiftable by means of a pin 65 projected through a slot 66 in the casing. When it is desired to close these auxiliary openings, the pin is shifted to swing the shutter to bring its openings away from such position, and the openings 43 and 44 will be closed by the main portion of the shutter.

By reason of the fuel regulating valve being located at the small end of the Venturi tube the priming air supply will evidently have its highest velocity at that point so that prior to the atomization of the liquid this will be forcibly carried up through the Venturi tube by the intensity of the priming air supply and by reason of the gradually increasing diameter of said tube from the valve upwardly to the discharge end of the tube, this priming air supply will gradually reduce in velocity during the time when the atomization of the liquid fuel is going on within said tube 67.

Means are also preferably provided whereby the normal size or area of the auxiliary port openings 43 and 44 can be varied, so that when the shutter or casing 40 is in the open position, and the outlet for the mixture also in the open position, and the valve at the spray orifice also opened, the amount of auxiliary air will be controlled or reduced. This is desirable for the purpose of accommodating the carbureter to the motor to which it is to be connected, and also sometimes to accommodate for different atmospheric conditions. In the present instance a cylindrical member 70, shown separately in Fig. 4, is mounted inside of the shell or shutter 40 and projects down into the casing section 14, and is preferably secured between the latter and the outer portion of the Venturi tube 25. It is shown as substantially locked to the latter member by a screw 71 passing through a slot 72 in the section 14, through an opening 73 in the shell 70, and tapped into a threaded opening 74 in the Venturi tube portion 25. The shutter 70 is provided on opposite sides with opening 75 that normally lie adjacent the openings 43 and 44 in the shell section 15. By shifting this member, upon loosening the screw and sliding the latter through its slot, the sides of the opening 75 can be caused to more or less throttle the openings 43 and 44. Then upon tightening the screw this member is locked in such position. This shell 70 preferably extends up inside of the shutter 40 without interfering with the oscillation of the latter. Its top is open, but supports the cross bar 37 that forms the nut or bearing for the threaded portion of the valve stem 42. But the latter is merely for constructional convenience and forms no essential part in the invention.

Means are also preferably provided whereby the auxiliary air passing in through the ports and upward in the annular space 77, is caused to have a circular movement as well as an upward movement, that is, is given a helical movement. The means herein provided for effecting this, comprises the peculiar shape given to the openings 75 and 76 in the shutter 70. The two lateral sides are not made vertical, but one of them 75ª is considerably inclined, while the other side is more nearly straight or vertical. The opening 76 is correspondingly shaped, and the inclined side is in the same rotative direction. From this construction, the auxiliary air entering will have the greater part go in on one side of the Venturi tube extension 67 than on the other side, through the same opening as indicated by the arrow in Fig. 2. On the opposite sides a similar effect is produced, as shown by the arrow, in Fig. 2 and the result is a circular movement as the air passes upward through the annular space 77. The effect of this is to cause a more intimate mixing or commingling of the auxiliary air with the carbureted air issuing at the top of the Venturi tube extension 67, whereby the vapor of the hydrocarbon is more intimately mixed, and more effectively vaporized in the mixing chamber, and before it reaches the cylinder of the motor.

One of the results which I have succeeded in obtaining to an unusual extent by means of my present improvement is that through the current regulation of the two said ports, auxiliary and exit, and of the fluid supply valve, I am able in practice to use in a carbureter of a given size and proportion an opening within the Venturi tube of much smaller diameter than would otherwise be required, and in this connection it should be remembered that in practice a more desirable character of the mixing of the air and the fluid can be obtained when the quantity of the auxiliary air is not excessive; that is to say, a minimum quantity of air supplied through the Venturi tube and there mixed with the fluid, and this preliminary mixture being then further mixed with a larger or supplemental supply of air directly permits the proper and complete mixing of all of the air with all of the incoming fluid before this passes on to the cylinder of the engine. One feature in this operation is that by reason of the constricted opening in the Venturi tube the air coming through the same is under ordinary working conditions naturally increased in velocity and is thereby able to most effectively take up, atomize and mix with the fuel supply. Also it is evident that this operation, obtained in the manner herein set forth, is particularly favorable for permitting the using of the carbureter with fluid fuels of considerable variation in viscosity and in other characteristics. It is also obviously desirable especially for such varying characteristics of fuel to employ a Venturi tube of the minimum practicable proportions, this tending to improve the result by increasing the fineness of the particles of fuel as these mix with and pass along with the air.

The specific arrangement of the valve controlling the spray orifice as herein disclosed, is not claimed in this application, but forms the subject matter of another application Serial No. 559,185, filed on the 3rd day of May, 1910.

In the float chamber as usually arranged in carbureters, the valve is adjustably connected with the ball or cork float, and the fulcrum is fixed. In the present construction the fulcrum for the float and valve is made adjustable. As shown, the float 21 has secured thereto a bar 81 that is pivoted to a block 82 projecting through an opening 83 in the top 84 of the float chamber 20. The block is slidable in this opening vertically, and has a threaded stem 85 carrying jam nuts 86. A bracket 87 secured to the top of the float, has a slotted arm 88 through which passes the threaded stem 85, one of the jam nuts on the screw being located on each side of this arm, whereby the block is vertically adjusted in the opening, and locked in the desired position. By this means the float can be adjusted to compensate for various densities of the gasolene, or for other conditions, and it can always be arranged to have the bar 81 engage the valve stem 22 and hold it closed when the bar is practically level, or in its position of maximum leverage. The bar is shown as having a slotted end 89 engaging jam nuts 90 on the threaded stem 22. The valve is elevated by a coil spring 91 engaging a collar 92 on the stem.

Having thus described my invention, I claim:

1. A carbureter including in combination, a casing, a fuel inlet device located centrally of the casing, a main air inlet for directing air about said fuel inlet device, a valve for controlling said fuel inlet device, said casing having an auxiliary air inlet, a shutter for said auxiliary air inlet, means for connecting said shutter to said valve, an independent shutter for said auxiliary air inlet, and a third shutter, whereby the size of the auxiliary air inlet may be varied.

2. A carbureter including in combination, a casing, a fuel inlet device located centrally of the casing, a main air inlet for directing air about said fuel inlet device, a valve for controlling said fuel inlet device, said casing having an auxiliary air inlet, an outlet, a shutter for said auxiliary air inlet, a shutter for said outlet, means for connecting said shutters, whereby they may be simultaneously operated, an independent shutter for the auxiliary air inlet, and a third independent shutter for adjusting the size of the auxiliary air inlet.

3. A carbureter including in combination, a casing, a fuel inlet device located centrally of the casing, a main air inlet for directing air about said fuel inlet device, a valve for controlling said fuel inlet device, said casing having an auxiliary air inlet and an outlet, a shutter for said auxiliary air inlet, a shutter for the outlet, means for connecting said shutters, whereby they may be simultaneously operated, means for connecting said shutters to said valve including a spindle having a worm wheel thereon, and a worm whereby the position of the valve may be adjusted relative to the shutters.

AMHERST G. LAMB.

Witnesses:
D. HILDRETH,
CHAS. M. HIBBARD.